(12) United States Patent
Lin

(10) Patent No.: US 9,509,595 B2
(45) Date of Patent: Nov. 29, 2016

(54) METHOD FOR PROCESSING SUBNET ROUTE AND MESSAGE FORWARDING EQUIPMENT

(71) Applicant: ZTE CORPORATION, Shenzhen, Guangdong Province (CN)

(72) Inventor: Ning Lin, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/648,111

(22) PCT Filed: Nov. 25, 2013

(86) PCT No.: PCT/CN2013/087796
§ 371 (c)(1),
(2) Date: May 28, 2015

(87) PCT Pub. No.: WO2014/082556
PCT Pub. Date: Jun. 5, 2014

(65) Prior Publication Data
US 2015/0304210 A1    Oct. 22, 2015

(30) Foreign Application Priority Data
Nov. 29, 2012   (CN) .......................... 2012 1 0497238

(51) Int. Cl.
*H04L 12/703*    (2013.01)
*H04L 12/751*    (2013.01)
(Continued)

(52) U.S. Cl.
CPC ........... *H04L 45/28* (2013.01); *H04L 12/6418* (2013.01); *H04L 45/02* (2013.01); *H04L 45/122* (2013.01); *H04L 45/22* (2013.01); *H04L 45/745* (2013.01); *H04L 61/103* (2013.01)

(58) Field of Classification Search
None
See application file for complete search history.

(56) References Cited

U.S. PATENT DOCUMENTS 7,007,101 B1 * 2/2006 Schwaderer ............ H04L 45/00
370/395.31
2004/0006639 A1 * 1/2004 Mathew .................. H04L 45/54
709/238

(Continued)

FOREIGN PATENT DOCUMENTS

| CN | 101636661 A | 1/2010 |
| CN | 102111342 A | 6/2011 |

(Continued)

OTHER PUBLICATIONS

International Search Report (Form PCT/ISA/210) for PCT/CN2013/087796 mailed Dec. 26, 2013.

*Primary Examiner* — Duc Duong
(74) *Attorney, Agent, or Firm* — Koppel, Patrick, Heybl & Philpott

(57) ABSTRACT

Provided are a method for processing a subnet route and message forwarding equipment. The method includes: it is detected that a next-hop host route to which the subnet route is directed becomes invalid; when the next-hop host route becomes invalid, a deletion instruction for deleting the next-hop host route is generated and issued; the deletion instruction is intercepted, and converted into a first updating instruction for modifying the next-hop host route; and a next-hop egress of the next-hop host route is updated into a Central Processing Unit (CPU) of the message forwarding equipment according to the first updating instruction. According to the disclosure, management over the subnet route can be simplified, and switching efficiency of the subnet route can be improved.

18 Claims, 2 Drawing Sheets

(51) Int. Cl.
  *H04L 12/64* (2006.01)
  *H04L 12/733* (2013.01)
  *H04L 12/707* (2013.01)
  *H04L 12/741* (2013.01)
  *H04L 29/12* (2006.01)

(56) References Cited

U.S. PATENT DOCUMENTS

2004/0230832 A1* 11/2004 McCallam ......... H04L 12/2602
  726/25
2007/0070883 A1* 3/2007 Lysne .................... H04L 45/00
  370/218
2007/0127502 A1* 6/2007 Zhu ....................... H04L 45/507
  370/397
2007/0162614 A1* 7/2007 Patel ...................... H04L 45/00
  709/239

FOREIGN PATENT DOCUMENTS

CN  102984062 A  3/2013
CN  101483548 A  7/2015

* cited by examiner

METHOD FOR PROCESSING SUBNET ROUTE AND MESSAGE FORWARDING EQUIPMENT

TECHNICAL FIELD

The disclosure relates to the field of switch and router products, including e.g., a method for processing a subnet route and message forwarding equipment.

BACKGROUND

An invalid subnet route refers to that the next-hop failure of the subnet route is invalid. Such condition of invalid subnet route usually appears when the subnet route exists but the next-hop host route of the subnet has been deleted. Specifically, it may appear when an Address Resolution Protocol (ARP) table item of the next-hop host route has been aged but the subnet route which is dynamically generated has not yet been deleted or when the subnet route is statically configured but the ARP table item of the next-hop host route is deleted or aged.

A commonly used method for managing an invalid subnet route in an existing technology is usually to make that the next-hop egress of the subnet route is directed to a Central Processing Unit (CPU), so that a subsequent data message can be sent to the CPU, and then the CPU triggers ARP relearning. However, when there are multiple subnet routes, these subnet routes are simultaneously directed to the same next-hop host route, and when the host route is invalid, the egresses of all the subnet routes may be modified into CPUs, which may cause multiple modification operations of the subnet routes in hardware. When the next-hop host route is restored, all the subnet routes are restored into the egresses to which the host route is directed, and then multiple restoration operations are required. Therefore, the route management may become relatively complicated, and efficiency of switching between invalidity and validity of the next hop is relatively low.

SUMMARY

According to an embodiment of the disclosure, a method for processing a subnet route and message forwarding equipment are provided, which simplify management over the subnet route and improve switching efficiency of the subnet route.

In order to solve the technical problem, solutions provided by the embodiment of the disclosure are as follows. A method for processing a subnet route, applied to message forwarding equipment, comprising: detecting that a next-hop host route to which the subnet route is directed becomes invalid; when the next-hop host route becomes invalid, generating and issuing a deletion instruction for deleting the next-hop host route; intercepting the deletion instruction, and converting the deletion instruction into a first updating instruction for modifying the next-hop host route; and updating a next-hop egress of the next-hop host route into a Central Processing Unit, CPU, of the message forwarding equipment according to the first updating instruction.

According to an embodiment of the disclosure, when the deletion instruction is intercepted, whether the next-hop host route is referenced by other subnet route or not is further judged; when the next-hop host route is referenced by said other subnet route, a step of converting the deletion instruction into the first updating instruction for modifying the next-hop host route is executed; and when the next-hop host route is not referenced by other subnet route, the next-hop host route is deleted according to the deletion instruction.

According to an embodiment of the disclosure, after updating the next-hop egress of the next-hop host route into the CPU of the message forwarding equipment, further comprising: for a received Internet Protocol (IP) message matching with the subnet route, forwarding the IP message to the CPU of the message forwarding equipment according to the next-hop host route corresponding to the subnet route, to enable the CPU to trigger Address Resolution Protocol (ARP) learning for the next-hop host route.

According to an embodiment of the disclosure, further comprising: detecting that the next-hop host route is restored to be valid; when the next-hop host route is restored to be valid, generating and issuing an addition instruction for adding the next-hop host route; intercepting the addition instruction, and converting the addition instruction into a second updating instruction for modifying the next-hop host route; and updating the next-hop egress of the next-hop host route into a currently valid next-hop egress according to the second updating instruction.

According to an embodiment of the disclosure, when the addition instruction is intercepted, whether the next-hop host route is referenced by other subnet route or not is further judged; when the next-hop host route is referenced by said other subnet route, a step of converting the addition instruction into the second updating instruction for modifying the next-hop host route is executed; and when the next-hop host route is not referenced by said other subnet route, the next-hop host route is added according to the addition instruction.

According to another embodiment of the disclosure, a message forwarding equipment, comprising: a detecting element, configured to detect that a next-hop host route to which a subnet route is directed becomes invalid; an instruction generating element, configured to, when the detecting element detects that the next-hop host route becomes invalid, generate and issue a deletion instruction for deleting the next-hop host route; an instruction intercepting element, configured to intercept the deletion instruction; an instruction converting element, configured to convert the deletion instruction intercepted by the instruction intercepting element into a first updating instruction for modifying the next-hop host route; and an updating element, configured to update a next-hop egress of the next-hop host route into a Central Processing Unit, CPU, of the message forwarding equipment according to the first updating instruction.

According to an embodiment of the disclosure, the instruction intercepting element is further configured to, when the deletion instruction is intercepted, further judge whether the next-hop host route is referenced by other subnet route or not; based on that a judgement result is that the next-hop host route is referenced by said other subnet route, trigger the instruction converting element; and based on that the judgement result is that the next-hop host route is referenced by said other subnet route, issue the deletion instruction; and the message forwarding equipment further comprises a deleting element, configured to delete the next-hop host route according to the deletion instruction issued by the instruction intercepting element.

According to an embodiment of the disclosure, further comprising: a message forwarding element, configured to, for a received Internet Protocol (IP) message matching with the subnet route, forward the IP message to the CPU of the message forwarding equipment according to the next-hop host route corresponding to the subnet route, to enable the CPU to trigger Address Resolution Protocol (ARP) learning for the next-hop host route.

According to an embodiment of the disclosure, the instruction generating element is further configured to, when the detecting element detects that the next-hop host route is restored to be valid, generate and issue an addition instruction for adding the next-hop host route; the instruction intercepting element is further configured to intercept the addition instruction; the instruction converting element is further configured to convert the addition instruction intercepted by the instruction intercepting element into a second updating instruction for modifying the next-hop host route; and the updating element is further configured to update the next-hop egress of the next-hop host route into a currently valid next-hop egress according to the second updating instruction.

According to an embodiment of the disclosure, the instruction intercepting element is further configured to, when the addition instruction is intercepted, further judge whether the next-hop host route is referenced by other subnet route or not; when a judgement result is that the next-hop host route is referenced by said other subnet route, trigger the instruction converting element; and when the judgement result is that the next-hop host route is referenced by said other subnet route, issue the addition instruction; and the message forwarding equipment further comprises an adding element, configured to add the next-hop host route according to the addition instruction issued by the instruction intercepting element.

From the above, according to the processing method for the subnet route and the message forwarding equipment provided by the embodiment of the disclosure, when the next-hop host route to which the subnet route is directed fails, a failing subnet route is managed by virtue of writing of host route hardware which should not exist, so that management and switching operation over the subnet route is greatly simplified, a switching speed of the failing subnet route which becomes valid again is increased, and moreover, a hardware resource of a system can be saved.

DETAILED DESCRIPTION OF THE EMBODIMENTS

A method for processing a subnet route is provided in the embodiment of the disclosure. By a simple and efficient management mechanism, an invalid subnet route can be conveniently managed. When the next hop of a host route invalid and becomes valid again, the subnet routes are not required to be switched one by one, and switching operation over all the subnet routes can be finished by once switching.

In order to make the purpose, technical solutions and advantages of the disclosure clearer, the disclosure is described below with reference to the drawings and specific embodiments in detail.

Figure 1:
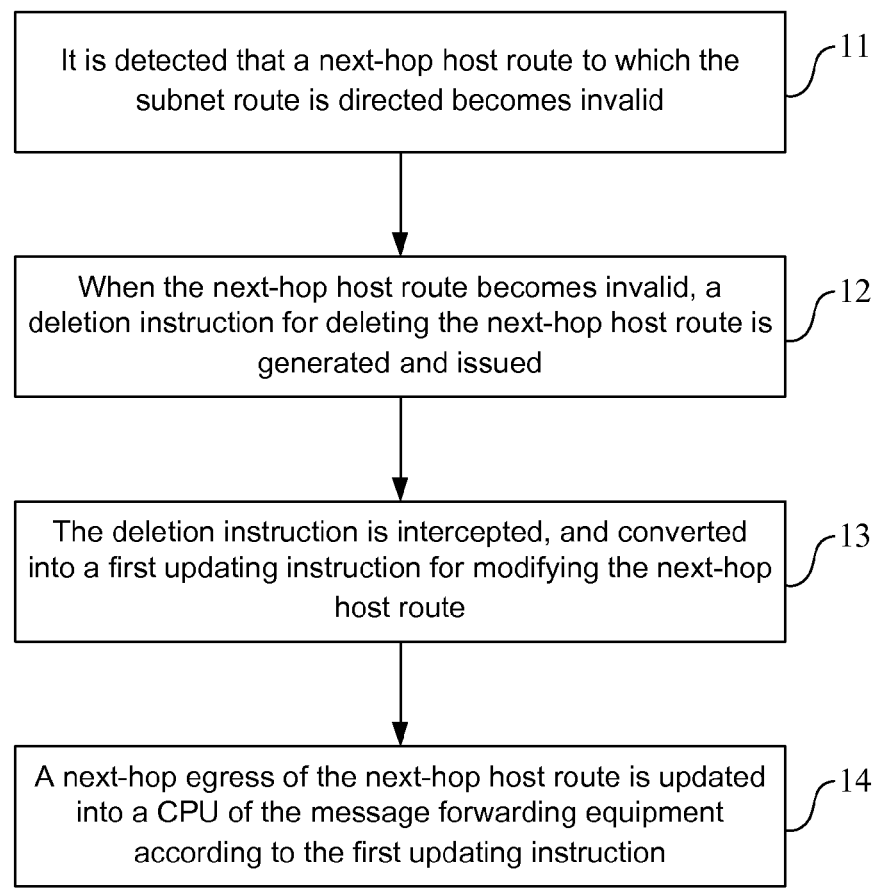
FIG. 1 is a flowchart of a method for processing a subnet route according to an embodiment of the disclosure.

The method for processing a subnet route provided in the embodiment of the disclosure, is applied to message forwarding equipment, wherein the message forwarding equipment may be a router or a switch supporting three-layer forwarding. As reference to FIG. 1, the method includes the following steps:

Step 11: It is detected that a next-hop host route to which the subnet route is directed becomes invalid.

Here, a normal subnet route is directed to a valid next-hop host route, and the host route is directed to a valid egress port. When an ARP table item of the egress port to which the next-hop host route is directed is deleted or aged, the next-hop host route is determined to become invalid; and when the ARP table item of the egress port to which the next-hop host route is directed is relearned, the next-hop host route is determined to be recovered to be valid.

Step 12: When the next-hop host route becomes invalid, a deletion instruction for deleting the next-hop host route is generated and issued.

Here, the deletion instruction is usually triggered to be generated by a routing protocol when the next-hop host route becomes invalid, and is issued to bottom-layer hardware.

Step 13: The deletion instruction is intercepted and converted into a first updating instruction for modifying the next-hop host route.

Here, the deletion instruction issued by the protocol may be intercepted at the bottom-layer hardware, and is correspondingly converted to perform special processing according to the embodiment of the disclosure, so that the host route in the hardware is not really deleted.

Step 14: A next-hop egress of the next-hop host route is updated into a CPU of the message forwarding equipment according to the first updating instruction.

Optionally, after Step 14, the embodiment of the disclosure may further include the following step:

Step 15: For a received IP message matching with the subnet route, the IP message is forwarded to the CPU of the message forwarding equipment according to the next-hop host route corresponding to the subnet route, to enable the CPU to trigger ARP learning for the next-hop host route.

A normal subnet route is directed to a valid next-hop host route, and the host route is directed to a valid egress port. When the host route is deleted, the subnet route may become an invalid subnet route. According to the embodiment of the disclosure, at this time in the method, in order to conveniently manage and rapidly restore the subnet route, the deletion operation over the next-hop host route is not really performed, but the host route is reserved in the hardware, and only the egress of the host route is updated into the CPU. In such a manner, the subnet route is directed to the host route, and the egress of the host route is the CPU, so that the operation of directing the subnet route to the CPU is finished.

From an implementation effect, the subnet route at this time is directed to the CPU, so that the influence on an effect of the routing protocol is eliminated, a subsequent message may still be sent to the CPU, and new ARP learning may be triggered. Although the host route existing in the hardware is not deleted, the host route is directed to the CPU, so as not to cause any other influence on the protocol.

Moreover, by the method, when the next-hop host route invalid, the subnet routes related to the next-hop host route are not required to be operated one by one. Due to the fact that only the egress direction of the host route is operated but a corresponding relationship between the host route and the subnet routes is not modified, the invalid subnet route can be managed without performing any operation on the subnet route through the method in the embodiment of the disclosure.

As an example implementation mode, the special processing according to the embodiment of the disclosure may be executed only when multiple subnet routes references to the next-hop host route. At this time, Step 13 in the embodiment may include the following specific steps:

Step 131: When the deletion instruction is intercepted, it is further judged whether the next-hop host route is referenced by other subnet route or not; when the next-hop host route is referenced by other subnet route, the Step 132 is executed; otherwise, the Step 133 is executed.

Step 132: When the next-hop host route is referenced by other subnet route, the deletion instruction is converted into the first updating instruction for modifying the next-hop host route, and then the Step 14 is executed; and Step 133: When the next-hop host route is not referenced by other subnet route, the next-hop host route is deleted according to the deletion instruction, and the flow is ended.

Similarly in a restoration process of the host route, the redirecting operation for all the subnet routes can be finished only by redirecting the host route to a valid egress without performing any operation on the subnet routes. At this time, the method according to the disclosure may further include the following steps:

Step 16: It is detected that the next-hop host route is restored to be valid.

Step 17: When the next-hop host route is restored to be valid, an addition instruction for adding the next-hop host route is generated and issued.

Here, the addition instruction is usually triggered to be generated by the routing protocol when the next-hop host route is restored to be valid, and is issued to the bottom-layer hardware.

Step 18: The addition instruction is intercepted and converted into a second updating instruction for modifying the next-hop host route.

Here, the addition instruction issued by the protocol may be intercepted at the bottom-layer hardware, and is correspondingly converted for special processing according to the embodiment of the disclosure.

Step 19: The next-hop egress of the next-hop host route is updated into a currently valid next-hop egress according to the second updating instruction.

As an example implementation mode, Step 18 may specifically include the following steps:

Step 181: When the addition instruction is intercepted, it is further judged whether the next-hop host route is referenced to other subnet route or not; when the next-hop host route is referenced by other subnet route, the Step 182 is executed; otherwise, the Step 183 is executed.

Step 182: When the next-hop host route is referenced by other subnet route, the addition instruction is converted into the second updating instruction for modifying the next-hop host route, and then the Step 19 is executed.

Step 183: When the next-hop host route is not referenced by other subnet route, the next-hop host route is added according to the addition instruction.

From the above, according to the embodiment of the disclosure, when the invalid host route is required to be deleted by the system, the host route is not really deleted rather than being directed to the CPU. By such as a little change, all the invalid subnet routes can be controlled and managed in a unified way. When the host route is restored to be valid, all the subnet routes related to the host route can be rapidly and effectively switched back together. Compared with a conventional method for managing the invalid subnet route, it does not need to perform any operation over the subnet route in the embodiment of the disclosure, and the host route is also not really deleted, so that the management and switching operation over the subset route can be simplified, the switching speed of the invalid subnet route which becomes valid again is increased, and moreover, the hardware resource of the system can be saved.

In order to better understand the method, the implementation of the scheme in the embodiment of the disclosure is described by virtue of a specific practical example.

Figure 2:
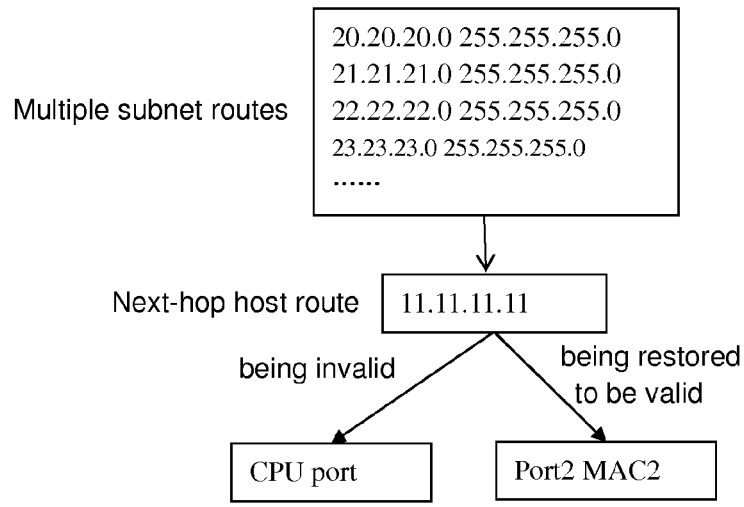
FIG. 2 is a diagram of an example of subnet route processing according to an embodiment of the disclosure.

As shown in FIG. 2, it is supposed that there are multiple subnet routes 20.20.20.0, 21.21.21.0, 22.22.22.0, 23.23.23.0 and the like, the next-hop host route of the multiple subnet routes is 11.11.11.11, the egress port of the next-hop host route is Port1/Mac1. When the next-hop host route invalid, an instruction for deleting the host route may be issued by the routing protocol.

At this time, the following processing steps are executed in the example:

a: It is judged whether the host route is referenced by other subnet route or not, and when the next-hop host route is referenced by other subnet route, the instruction for deleting the host route is not processed, but is converted into an instruction of updating the host route;

b: The egress of the host route is converted into a CPU;

c: The subnet route 10.10.10.0 is not processed. Because the subnet route 10.10.10.0 is still directed to the next-hop host route 11.11.11.11, the egress of the subnet route 10.10.10.0 is also directed to the CPU;

When the host route is restored to be valid, and the valid egress port is Port2/Mac2, at this time, the instruction for adding the host route may be issued by the routing protocol;

At this time, the following processing steps are executed in the example:

d: It is judged whether the next-hop host route is referenced by other subnet route or not, and when the next-hop host route is referenced by other subnet route, the instruction for adding the host route is not processed, but is converted into the instruction for updating the host route;

e: The egress of the host route is modified into Port2/Mac; and f: The subnet route 10.10.10.0 is not processed. Because the subnet route 10.10.10.0 is still directed to the next-hop host route 11.11.11.11, the egress of the subnet route 10.10.10.0 is also directed to Port2/Mac2.

From the above technical solution, compared with the ordinary method for managing the invalid subnet route, the method provided by the embodiment of the disclosure has the advantages that an expectation and requirement of the routing protocol on a subnet route behaviour are met, and the management on the invalid subnet route and rapid switching of the subnet route which becomes valid again can be rapidly and conveniently realized; and moreover, in the aspect of the management flow, the management mechanism of directing the subnet route to the next-hop host route and directing the host route to an actual egress port is also followed without any additional management mechanism, so that the method can be well compatible with an existing protocol. From the above, the switching efficiency and the management convenience of the method according to the embodiment of the disclosure are greatly improved compared with those of a related art.

Figure 3:
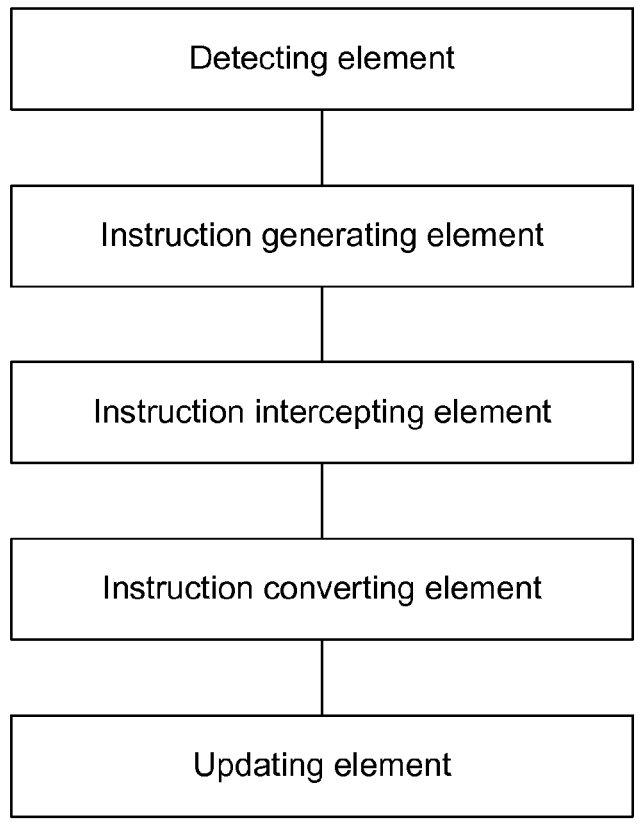
FIG. 3 is a structure diagram of message forwarding equipment according to an embodiment of the disclosure.

Based on the method, a message forwarding equipment further is provided in the embodiment of the disclosure, which may be equipment such as a router or a switch supporting three-layer routing. As shown in FIG. 3, the equipment includes:

a detecting element, configured to detect that a next-hop host route to which a subnet route is directed becomes invalid;

an instruction generating element, configured to, when the detecting element detects that the next-hop host route becomes invalid, generate and issue a deletion instruction for deleting the next-hop host route;

an instruction intercepting element, configured to intercept the deletion instruction;

an instruction converting element, configured to convert the deletion instruction intercepted by the instruction intercepting element into a first updating instruction for modifying the next-hop host route; and an updating element, configured to update a next-hop egress of the next-hop host route into a CPU of the message forwarding equipment according to the first updating instruction.

Optionally, the equipment may further include:

a message forwarding element, configured to, for a received IP message matching with the subnet route, forward the IP message to the CPU of the message forwarding equipment according to the next-hop host route corresponding to the subnet route, to enable the CPU to trigger ARP learning for the next-hop host route.

Wherein, the instruction intercepting element is further configured to, when the deletion instruction is intercepted, further judge whether the next-hop host route is referenced by other subnet route or not; based on that a judgement result is that the next-hop host route is referenced by other subnet route, trigger the instruction converting element, otherwise, the deletion instruction is issued; and at this time, the message forwarding equipment further includes an deleting element, configured to delete the next-hop host route according to the deletion instruction issued by the instruction intercepting element.

The equipment may rapidly execute route switching when the host route is restored, and at this time:

the instruction generating element is further configured to, when the detecting element detects that the next-hop host route is restored to be valid, generate and issue an addition instruction for adding the next-hop host route;

the instruction intercepting element is further configured to intercept the addition instruction;

the instruction converting element is further configured to convert the addition instruction intercepted by the instruction intercepting element into a second updating instruction for modifying the next-hop host route; and the updating element is further configured to update the next-hop egress of the next-hop host route into a currently valid next-hop egress according to the second updating instruction.

As an example implementation mode, the instruction intercepting element is further configured to, when the addition instruction is intercepted, further judge whether the next-hop host route is referenced by other subnet route or not; when a judgement result is that the next-hop host route is referenced by other subnet route, trigger the instruction converting element; otherwise, issue the addition instruction; and the message forwarding equipment further includes an adding element, configured to add the next-hop host route according to the addition instruction issued by the instruction intercepting element.

Many functional parts described in the Specification are called elements, to more particularly emphasize independent of their implementation manners.

In the embodiment of the disclosure, the elements can be implemented by software, so as to be executed by various types of processors. For example, an identified executable code element may include one or more physical or logic blocks of a computer instruction, and can be, for example, structured into an object, a process or a function. However, executable codes of the identified element are not required to be physically located together, and may include different instructions stored at different physical locations, and when these instructions are logically combined, they form the element and achieve a specified purpose of the element.

Actually, the executable code element may be a single instruction or multiple instructions, and even may be distributed on multiple different code segments, in different programs and across multiple pieces of memory equipment. Similarly, operating data may be identified in the element, and may be implemented in any proper form and organized in a data structure of any proper type. The operating data may be collected as a single dataset, or may be distributed at different locations (including different memory equipment), and may at least partially exist in a system or a network as an electrical signal.

When the elements can be implemented by virtue of software, in consideration of the level of an existing hardware process, those skilled in the art can realize corresponding functions of the elements which can be implemented by software by constructing corresponding hardware circuits regardless of cost, and the hardware circuits include conventional Ultra Large Scale Integration (ULSI) circuits or gate arrays and existing semiconductors such as logic chips and transistors or other discrete elements. The elements may also be implemented by programmable hardware equipment, such as a field programmable gate array, a programmable array logic and programmable logic equipment.

The above is only the implementation mode of the disclosure, it should be noted that those skilled in the art can make a plurality of improvements and embellishments on the premise of not departing from the principle of the disclosure, and the improvements and embellishments also shall fall within the scope of protection of the disclosure.

INDUSTRIAL PRACTICABILITY

As mentioned above, the method for processing the subnet route and the message forwarding equipment provided in the embodiment of the disclosure bring the beneficial effects as follows: the management on the subnet route is simplified, and the switching efficiency of the subnet route is improved.

What is claimed is:

1. A method for processing a subnet route, applied to message forwarding equipment, comprising:
    detecting that a next-hop host route to which the subnet route is directed becomes invalid;
    when the next-hop host route becomes invalid, generating and issuing a deletion instruction for deleting the next-hop host route;
    intercepting the deletion instruction, and converting the deletion instruction into a first updating instruction for modifying the next-hop host route; and
    updating a next-hop egress of the next-hop host route into a Central Processing Unit, CPU, of the message forwarding equipment according to the first updating instruction.

2. The method according to claim 1, wherein
when the deletion instruction is intercepted, whether the next-hop host route is referenced by other subnet route or not is further judged;
when the next-hop host route is referenced by said other subnet route, a step of converting the deletion instruction into the first updating instruction for modifying the next-hop host route is executed; and
when the next-hop host route is not referenced by other subnet route, the next-hop host route is deleted according to the deletion instruction.

3. The method according to claim 2, wherein the method further comprises:
detecting that the next-hop host route is restored to be valid;
when the next-hop host route is restored to be valid, generating and issuing an addition instruction for adding the next-hop host route;
intercepting the addition instruction, and converting the addition instruction into a second updating instruction for modifying the next-hop host route; and
updating the next-hop egress of the next-hop host route into a currently valid next-hop egress according to the second updating instruction.

4. The method according to claim 3, wherein
when the addition instruction is intercepted, whether the next-hop host route is referenced by other subnet route or not is further judged;
when the next-hop host route is referenced by said other subnet route, a step of converting the addition instruction into the second updating instruction for modifying the next-hop host route is executed; and
when the next-hop host route is not referenced by said other subnet route, the next-hop host route is added according to the addition instruction.

5. The method according to claim 1, wherein after updating the next-hop egress of the next-hop host route into the CPU of the message forwarding equipment, the method further comprises:
for a received Internet Protocol (IP) message matched with the subnet route, forwarding the IP message to the CPU of the message forwarding equipment according to the next-hop host route corresponding to the subnet route, to enable the CPU to trigger Address Resolution Protocol (ARP) learning for the next-hop host route.

6. The method according to claim 5, wherein the method further comprises:
detecting that the next-hop host route is restored to be valid;
when the next-hop host route is restored to be valid, generating and issuing an addition instruction for adding the next-hop host route;
intercepting the addition instruction, and converting the addition instruction into a second updating instruction for modifying the next-hop host route; and
updating the next-hop egress of the next-hop host route into a currently valid next-hop egress according to the second updating instruction.

7. The method according to claim 6, wherein
when the addition instruction is intercepted, whether the next-hop host route is referenced by other subnet route or not is further judged;
when the next-hop host route is referenced by said other subnet route, a step of converting the addition instruction into the second updating instruction for modifying the next-hop host route is executed; and
when the next-hop host route is not referenced by said other subnet route, the next-hop host route is added according to the addition instruction.

8. The method according to claim 1,
wherein the method further comprises:
detecting that the next-hop host route is restored to be valid;
when the next-hop host route is restored to be valid, generating and issuing an addition instruction for adding the next-hop host route;
intercepting the addition instruction, and converting the addition instruction into a second updating instruction for modifying the next-hop host route; and
updating the next-hop egress of the next-hop host route into a currently valid next-hop egress according to the second updating instruction.

9. The method according to claim 8, wherein
when the addition instruction is intercepted, whether the next-hop host route is referenced by other subnet route or not is further judged;
when the next-hop host route is referenced by said other subnet route, a step of converting the addition instruction into the second updating instruction for modifying the next-hop host route is executed; and
when the next-hop host route is not referenced by said other subnet route, the next-hop host route is added according to the addition instruction.

10. A message forwarding equipment, comprising:
a detecting element, configured to detect that a next-hop host route to which a subnet route is directed becomes invalid;
an instruction generating element, configured to, when the detecting element detects that the next-hop host route becomes invalid, generate and issue a deletion instruction for deleting the next-hop host route;
an instruction intercepting element, configured to intercept the deletion instruction;
an instruction converting element, configured to convert the deletion instruction intercepted by the instruction intercepting element into a first updating instruction for modifying the next-hop host route; and
an updating element, configured to update a next-hop egress of the next-hop host route into a Central Processing Unit (CPU) of the message forwarding equipment according to the first updating instruction.

11. The message forwarding equipment according to claim 10, wherein
the instruction intercepting element is further configured to, when the deletion instruction is intercepted, further judge whether the next-hop host route is referenced by other subnet route or not; based on that a judgement result is that the next-hop host route is referenced by said other subnet route, trigger the instruction converting element; and based on that the judgement result is that the next-hop host route is referenced by said other subnet route, issue the deletion instruction; and
the message forwarding equipment further comprises a deleting element, configured to delete the next-hop host route according to the deletion instruction issued by the instruction intercepting element.

12. The message forwarding equipment according to claim 11, wherein
the instruction generating element is further configured to, when the detecting element detects that the next-hop host route is restored to be valid, generate and issue an addition instruction for adding the next-hop host route;

the instruction intercepting element is further configured to intercept the addition instruction;

the instruction converting element is further configured to convert the addition instruction intercepted by the instruction intercepting element into a second updating instruction for modifying the next-hop host route; and the updating element is further configured to update the next-hop egress of the next-hop host route into a currently valid next-hop egress according to the second updating instruction.

13. The message forwarding equipment according to claim 12, wherein the instruction intercepting element is further configured to, when the addition instruction is intercepted, further judge whether the next-hop host route is referenced by other subnet route or not; when a judgement result is that the next-hop host route is referenced by said other subnet route, trigger the instruction converting element; and when the judgement result is that the next-hop host route is referenced by said other subnet route, issue the addition instruction; and the message forwarding equipment further comprises an adding element, configured to add the next-hop host route according to the addition instruction issued by the instruction intercepting element.

14. The message forwarding equipment according to claim 10, wherein the message forwarding equipment further comprises:

a message forwarding element, configured to, for a received Internet Protocol (IP) message matching with the subnet route, forward the IP message to the CPU of the message forwarding equipment according to the next-hop host route corresponding to the subnet route, to enable the CPU to trigger Address Resolution Protocol (ARP) learning for the next-hop host route.

15. The message forwarding equipment according to claim 14, wherein the instruction generating element is further configured to, when the detecting element detects that the next-hop host route is restored to be valid, generate and issue an addition instruction for adding the next-hop host route;

the instruction intercepting element is further configured to intercept the addition instruction;

the instruction converting element is further configured to convert the addition instruction intercepted by the instruction intercepting element into a second updating instruction for modifying the next-hop host route; and the updating element is further configured to update the next-hop egress of the next-hop host route into a currently valid next-hop egress according to the second updating instruction.

16. The message forwarding equipment according to claim 15, wherein the instruction intercepting element is further configured to, when the addition instruction is intercepted, further judge whether the next-hop host route is referenced by other subnet route or not; when a judgement result is that the next-hop host route is referenced by said other subnet route, trigger the instruction converting element; and when the judgement result is that the next-hop host route is referenced by said other subnet route, issue the addition instruction; and the message forwarding equipment further comprises an adding element, configured to add the next-hop host route according to the addition instruction issued by the instruction intercepting element.

17. The message forwarding equipment according to claim 10, wherein the instruction generating element is further configured to, when the detecting element detects that the next-hop host route is restored to be valid, generate and issue an addition instruction for adding the next-hop host route;

the instruction intercepting element is further configured to intercept the addition instruction;

the instruction converting element is further configured to convert the addition instruction intercepted by the instruction intercepting element into a second updating instruction for modifying the next-hop host route; and the updating element is further configured to update the next-hop egress of the next-hop host route into a currently valid next-hop egress according to the second updating instruction.

18. The message forwarding equipment according to claim 17, wherein the instruction intercepting element is further configured to, when the addition instruction is intercepted, further judge whether the next-hop host route is referenced by other subnet route or not; when a judgement result is that the next-hop host route is referenced by said other subnet route, trigger the instruction converting element; and when the judgement result is that the next-hop host route is referenced by said other subnet route, issue the addition instruction; and the message forwarding equipment further comprises an adding element, configured to add the next-hop host route according to the addition instruction issued by the instruction intercepting element.

* * * * *